(12) United States Patent
Dennison (10) Patent No.: US 6,487,650 B1
(45) Date of Patent: Nov. 26, 2002

(54) PROCESS-LOOP MONITOR SYSTEM AND METHOD

(76) Inventor: Roger Dennison, 4 Taft Ave., Lexington, MA (US) 02421

( * ) Notice: Subject to any disclaimer, the term of this patent is extended or adjusted under 35 U.S.C. 154(b) by 0 days.

(21) Appl. No.: 09/526,668

(22) Filed: Mar. 16, 2000

(51) Int. Cl.[7] ................................................ G06F 13/00
(52) U.S. Cl. ........................ 711/217; 711/159; 711/167; 711/173; 711/220
(58) Field of Search ................................. 711/161, 162, 711/159, 163, 170, 217, 220, 167, 173

(56) References Cited

U.S. PATENT DOCUMENTS 5,564,033 A  * 10/1996 Takekuma et al. .......... 711/115
6,189,069 B1 *  2/2001 Parkes et al. ................ 711/100
6,295,608 B1 *  9/2001 Parkes et al. ................... 714/1

* cited by examiner

Primary Examiner—Kevin Verbrugge
Assistant Examiner—Jasmine Song
(74) Attorney, Agent, or Firm—Mirick, O'Connell, DeMallie & Lougee, LLP (57) ABSTRACT

Methods of maintaining a record of a samples of a time-dependent variable in a computer memory whereby any period of time extending backward from the present, having a duration between a pre-determined minimum and a pre-determined maximum, is represented by samples whose spacing is short in relation to the duration of the time period represented.

11 Claims, 6 Drawing Sheets

PROCESS-LOOP MONITOR SYSTEM AND METHOD

FIELD OF THE INVENTION

This invention relates to a method of storing regularly sampled data in a computer memory in such a way that recent data is represented in detail and older data is maintained in progressively less detail.

BACKGROUND OF THE INVENTION

When a variable quantity is measured periodically, and a record of that variable quantity is maintained in a memory of limited size, it is common practice to discard the oldest samples in memory in order to make room for new samples, and thus maintain in memory a fixed number of equally-spaced samples. Such a recording technique provides data at a fixed sampling interval back to a particular point in time and no data beyond that point.

SUMMARY OF THE INVENTION

In this invention, the available memory is divided into a number of segments, and those segments are used for selectively storing the data, in such a way that a single, integrated record is obtained that represents recent data at a short sampling interval and older data at progressively longer sampling intervals.

Two embodiments of the invention are detailed herein. In the first embodiment, data samples are recorded into the various segments of memory as follows. Every other sample, starting with the first, is recorded into the first segment of memory. Every fourth sample, starting with the second, is recorded into the second segment of memory. Every eighth sample, starting with the fourth, is recorded into the third segment, and so on. The last segment is treated differently, so that it contains all of the samples that do not fall into any of the preceding segments. Any segment, when full, is overwritten from the start. Methods are described for addressing the necessary memory locations and for recovering sequential data from the memory. The same result could be achieved by maintaining a separate record in memory for each of several sampling intervals. The invention has the advantage of not requiring that any data samples be stored in more than one location.

The second embodiment of the invention is for creating a record whose elements will represent periods of time, such as maxima or averages. In such a case, the samples should be combined so that the samples represent longer periods of time as the data age. Again, the memory is divided into a number of segments. All data samples are written into the first segment. When that segment is full and its first entry is about to be overwritten, the first entry is combined with the second entry and the result is written into the second segment. When the third entry in the first segment is about to be overwritten, it is combined with fourth entry and recorded in the second location in the second segment. The process is the same for all subsequent entries in the first segment and for all subsequent segments, except that data from the last segment are lost when they are overwritten. As with the first embodiment, methods are described for addressing the necessary memory locations for recording and for accessing data samples to be combined, and methods are described for extracting data from the record.

An embodiment of the device for practicing the invention typically consists of a data recording device consisting of a signal input, one or more microprocessors, a memory unit, a push-button control input and a communications port for transmitting data to a host computer. The invention concerns the selection of data locations to which the data are to be recorded, methods of combining and re-recording previously-recorded data, and the method of re-ordering and interpreting the data once they have been transmitted to the host computer.

Definition of Terms

To facilitate the description of the invention, the following terminology will be used.

Sampling interval the period of time from one sample to the next. The period is typically one hour divided by an integral power of two.

Data sample one or more pieces of information recorded at a particular time. (In some cases, the data sample may be recorded over the sampling interval preceding the time associated with the data sample.)

Segment of memory one of several sections of memory. The samples within each segment of memory all represent equal sampling intervals. In the first and second embodiments described, the segments are of equal length.

Entry a number corresponding to the location of a data sample within a segment of memory. Reading number a number corresponding to a particular data sample.

Methods will be described for determining locations within memory at which data samples will be stored and for locating samples to be combined and determining the locations at which the combined samples will be stored. Methods will also be described by which the host computer will locate, within the data transferred from the logger, sequential samples of the recorded data, and by which the host computer will determine the times when the samples were taken.

In a first embodiment this invention features a method of saving data samples in a computer memory, the data samples representing data obtained over a period of time, and provided at a data input source, comprising: dividing computer memory into a plurality of memory segments, each said segment having a plurality of data memory locations; sequentially saving all data samples except those falling in an equally-spaced sequence into the first segment of memory, and recording all of those in that sequence into subsequent segments of memory.

This method may further include saving all of the samples in said equally-spaced sequence into the second segment of memory, except for those of that sequence falling into a second sequence of equally-spaced samples, a subset of the first sequence, and for each subsequent segment recording all samples not recorded in earlier segments except for an equally-spaced sequence of data samples, and then recording in the last segment all samples not recorded in previous segments.

The method may further include the refinement of the steps of saving data samples to the first, second and subsequent memory segments, the refinement including, when all memory locations in a segment are full, sequentially overwriting the data in the memory locations in the same sequence as before so that the oldest data in any memory segment is always the next to be overwritten. In another feature, the method may further include retrieving saved data organized in chronological order and calculating the time corresponding to each data sample.

In a second embodiment, the invention features a method of saving data samples in a computer memory, the data samples representing data obtained over a period of time, and provided at a data input source, comprising: dividing computer memory into a plurality of memory segments, each said segment having a plurality of data memory locations, the first segment having at least n memory locations; periodically obtaining data samples from the data input source; sequentially saving the first obtained data samples into the n memory locations of the first segment; combining two of the saved data samples, and saving the combination into a memory location of the second segment; and saving another later obtained data sample into the memory location of one of the combined data samples.

In this embodiment, the method may further include combining subsequent pairs of data samples in the first segment, writing the combined data sample into the second memory segment, and subsequently writing new data samples into the locations in the first memory segment from which the data samples were taken to be combined. The method may further include, when the memory locations in the second segment and any later segment except the last have been filled, combining data samples from that segment and writing them into the next available location in the next available segment. Further, the number of samples combined at any time may be an integer greater than two. Finally, combining two or more of the saved data samples may comprise averaging, taking a maximum, or taking the last of said data samples.

BRIEF DESCRIPTION OF THE DRAWINGS

Other objects, features and advantages will occur to those skilled in the art from the following description of two preferred embodiments and the accompanying drawings, in which.

DETAILED DESCRIPTION OF THE FIRST EMBODIMENT

Overview of Recording Technique

The memory is divided into a number of segments, all of equal length. There might be 16 segments of 512 samples each, the segments being numbered zero through 15. The microprocessor counts the samples, assigning a consecutive number to each, starting with sample one. Odd-numbered samples are recorded in segment zero, consecutively from beginning to end. When the segment is full, the first sample is overwritten, and then the second, and so on. Samples whose numbers are divisible by two but not by four are similarly recorded in segment one; samples whose numbers are divisible by four but not by eight are recorded in segment two, and so on except for the last segment, in this case segment 15. While all other segments contain samples whose numbers are divisible by two raised to the power of the segment number, but not divisible by two raised to a power one greater, the last segment contains all samples whose numbers are divisible by two to the last segment number power, that is, in this case, by two to the 15th power or 32,768.

This technique allows the user to view, in a reasonable level of detail, histories covering periods ranging from very short to quite long. For the example given, using a memory of only 8192 samples, histories of 512 to 1024 equally-spaced samples could be displayed for any period, ending with the time the data was recovered, that was between one hour and 3.7 years long. (The maximum period is determined by the period covered by the last segment of memory; the most recent data are available at a sampling rate of 512 samples per hour.)

Example (1) illustrates the technique for a 16-cell memory, consisting of four segments of four cells each. The figure shows which samples reside at each location in memory after the thirty-first sample has been recorded. In all of the segments, the first entry in the segment was the sample whose number was two raised to the segment number power. Subsequent entries in Segments 0, 1 and 2 were spaced by the amount of two raised to a power one greater than the segment number. When a segment was filled, its first entry was overwritten, then its second, and so on, with succeeding samples destined for that segment. The last segment, segment three, differs from the others in that all samples whose numbers are divisible by two raised to its power (that is, whose numbers are divisible by eight) are written into it.

|         | Segment 0 |         |         | Segment 1 | Segment 2 | Segment 3 |
|---------|-----------|---------|---------|-----------|-----------|-----------|
| Entry 0 | ~~1~~     | ~~9~~   | ~~17~~  | 25 ~~2~~  | 18        | 4         | 8  |
| Entry 1 | ~~3~~     | ~~11~~  | ~~19~~  | 27 ~~6~~  | 22        | 12        | 16 |
| Entry 2 | ~~5~~     | ~~13~~  | ~~21~~  | 29 ~~10~~ | 26        | 20        | 24 |
| Entry 3 | ~~7~~     | ~~15~~  | ~~23~~  | 31 ~~16~~ | 30        | 28        |    |

Figure 1:
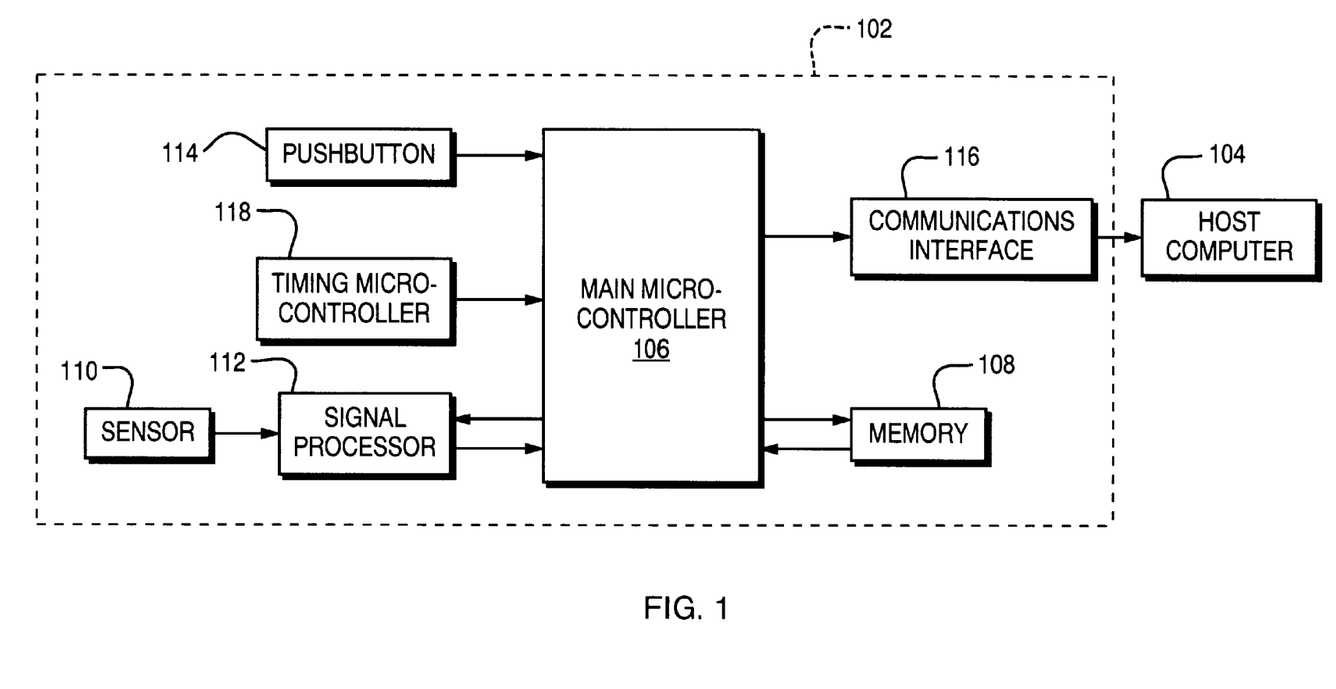
FIG. 1 is a functional block diagram illustrating the major elements of a simple data logger which can be used to practice the methods of this invention.
Figure 2:
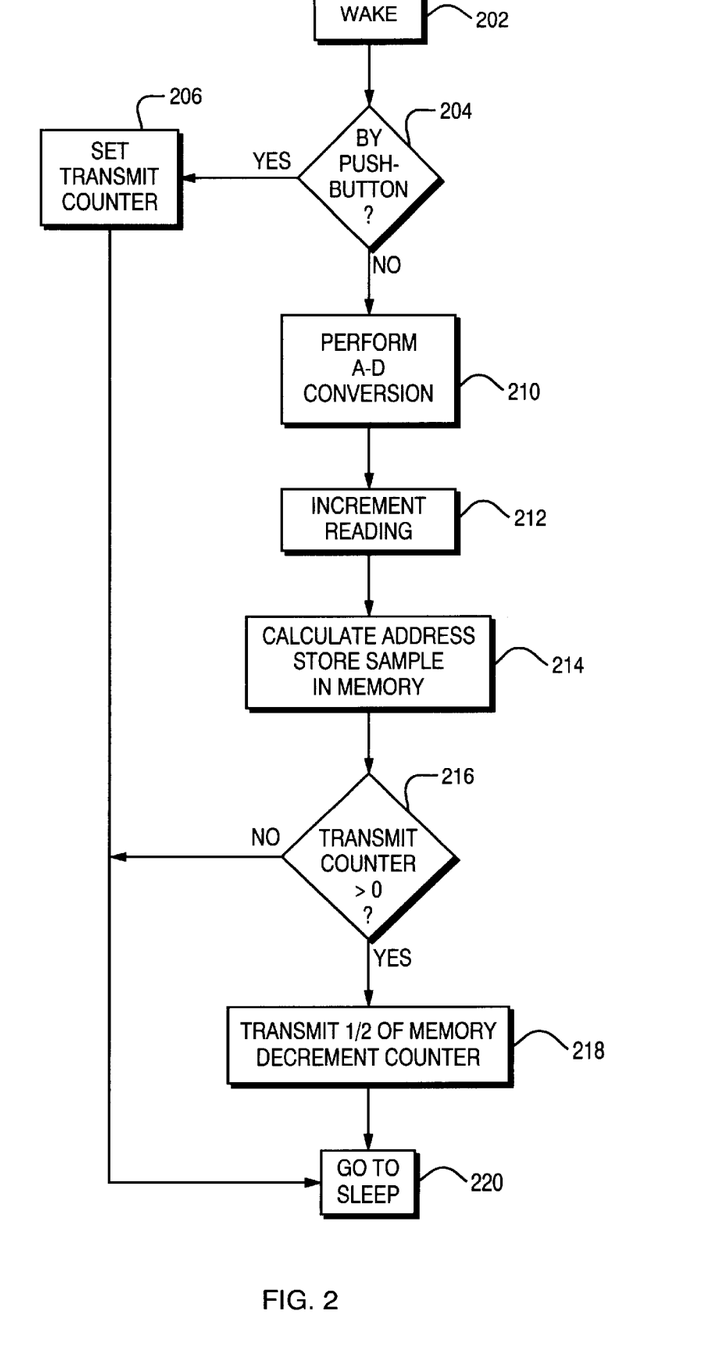
FIG. 2 is a flow chart illustrating a portion of the program flow within the microcontroller of FIG. 1.

EXAMPLE 1
Progressive Recording in a Sixteen-Location Memory Consisting of Four Segments of Four Entries Each
Detailed Description A data logger for practicing the first form of the invention is illustrated in FIG. 1 and program flow within its main microcontroller is illustrated in FIG. 2. FIG. 1 is a block diagram showing the data logger 102 with its major internal components and the host computer 104. The datalogger contains a main microcontroller 106, a memory section 108, a sensor 110, a signal processing section 112 which may contain an analog-to-digital converter, a pushbutton switch 114 to allow the user to control the device, a communications interface 116 to allow the datalogger to communicate with the standard serial port of the host computer and a timing microcontroller 118. The timing microcontroller operates under control of a 32.768 kHz crystal and generates a timing pulse once every 7.03 seconds to wake the main microcontroller to take a sample. The main microcontroller operates on a four mHz internal oscillator and it is active only a small portion of the time. The memory is a serial EEPROM with capacity for 8,192 eight-bit words. The sensor typically is a sensing resistor producing a dc voltage which is measured by an eight-bit analog-to-digital converter in the signal processor. The result is stored in the memory as one eight-bit word per sample. The communications interface may be an integrated circuit intended for the purpose, it may be assembled of components or it may include a transmitting photodiode and a receiving phototransistor with signal-processing circuitry. Methods of interfacing microcontrollers with analog input signals and with host computers are well known and will not be described in detail here. Since the device is intended to operate for very long periods of time, it is typically powered from an external dc voltage source and it contains a rechargeable battery to permit it to continue to record and keep time when the external power source is interrupted.

The recording process starts when power is applied to the circuit. Information may be transmitted to the host computer at any time, in response to the pushbutton being pressed. When this is done, the contents of memory are transmitted sequentially, that is, in the order in which they appear in memory, and various parameters relevant to the recording process are transmitted as well. These features are common to many types of dataloggers and will not be discussed in detail. With a transmission rate of 19,200 baud and a memory capacity of 8,192 bytes, device requires approximately five seconds to transmit the contents of its memory. Since data samples are taken every 7.03 seconds, the transmission can occur during the interval between two data samples.

In the preferred embodiments, the main microcontroller is an eight-bit device. Several of the variables involved in tracking the recording process and calculating memory addresses are too large to be stored in individual eight-bit memory locations. Consequently, two or more memory locations must be manipulated in order to process these individual variables. The methods of doing this are well known to those experienced in programming microcontrollers and will not be described here. For simplicity, single names will be used to refer to variables occupying two or more memory locations.

FIG. 2 is a flow chart indicating the portion of the microcontroller program that is of interest here. Portions not shown in detail perform such functions as interfacing with the host computer, controlling program flow in response to the pushbutton and controlling the analog-to-digital conversion.

Figure 3:
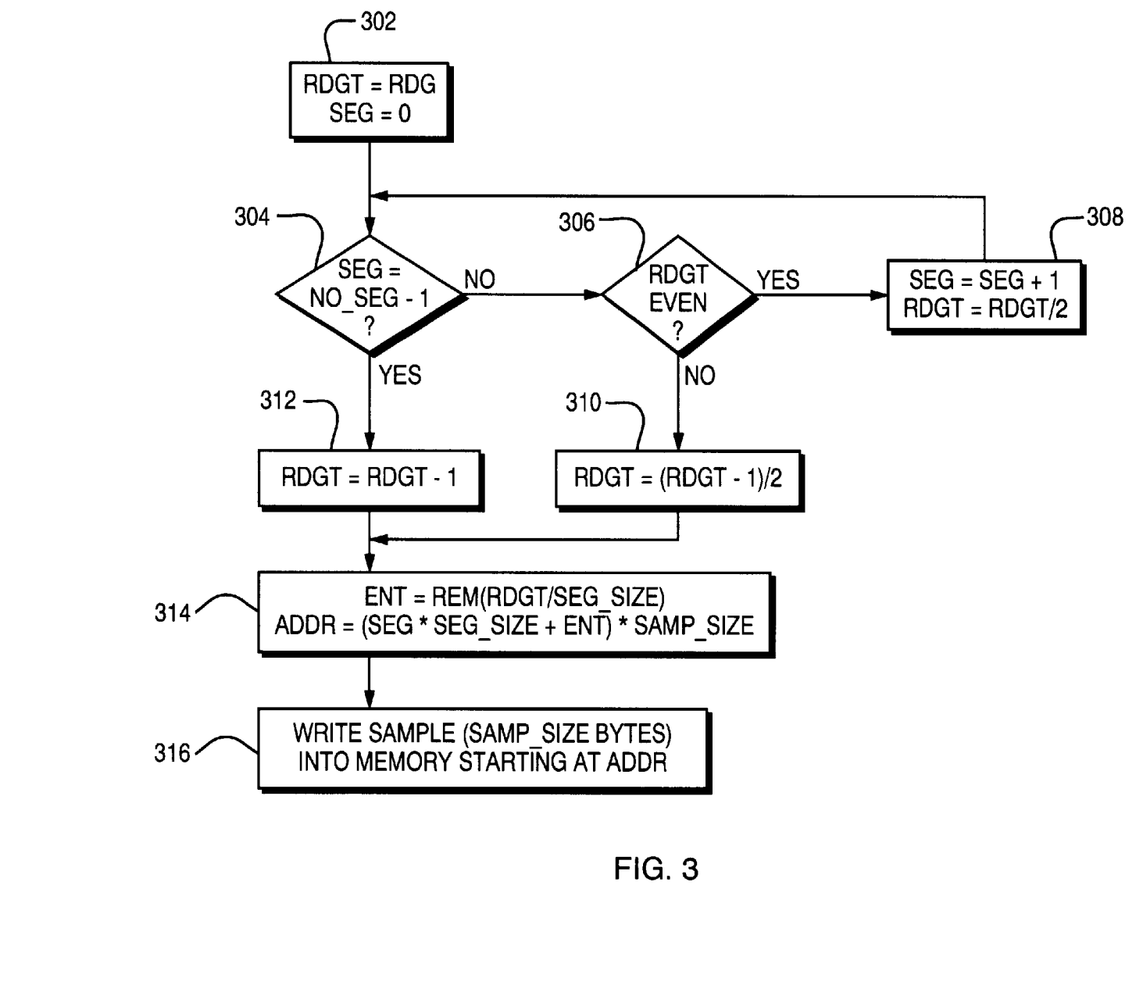
FIG. 3 and FIG. 5 are flow charts detailing a portion of the flow chart in FIG. 2, for the first and second embodiments, respectively.

FIG. 3 is a flow chart illustrating the process of recording a data sample in the first embodiment.

Figure 4:
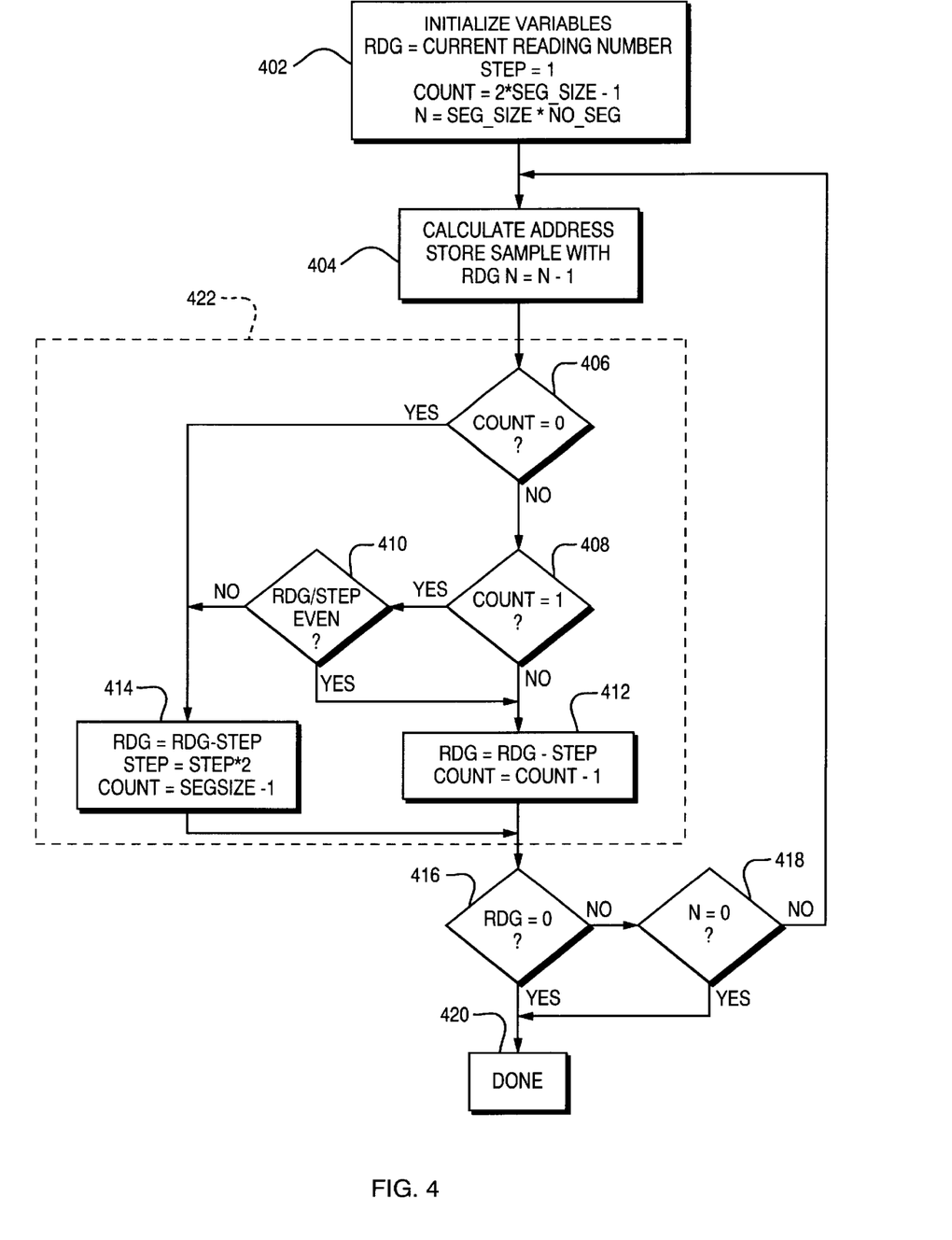
FIG. 4 and FIG. 6 are flow charts detailing the process used by the host computer in extracting data from the array transmitted by the logger, putting it in chronological order, and calculating the date and time associated with each data sample.

FIG. 4 is a flow chart illustrating the method by which the host computer locates data samples within the data transmitted by the logger, places the data samples in chronological order, and calculates the date and time associated with each.

The following variables, maintained by the program and stored in the RAM of the microcontroller, are of interest here.

Address (ADDR) (two bytes) the location within memory at which the data sample will be stored. This variable is not saved from one recording cycle to the next.

Reading (RDG) (four bytes) is the identifying number of the data sample, counting from the start of recording. It is stored as four bytes. If data samples are taken at the intended rate of 512 per hour, this variable will uniquely identify data samples for 957 years.

Reading-Temporary (RDGT) a memory location into which RDG is copied and which is used in calculating ADDR.

Segment (SEG) (one byte) the segment of memory currently under consideration.

Segment Size (SEG_SIZE) (one byte) the number of samples in each segment.

Entry (ENT) (two bytes) the location within the segment at which the sample will be stored.

Number of Segments (NO_SEG) the number of segments in memory.

Sample Size (SAMP_SIZE) the number of bytes in each sample.

The program flow, FIG. 2, begins when the main microcontroller wakes 202. It first checks to see if it was wakened by the pushbutton 204. If so, it sets its transmit counter 206 to five (five pulses of data will be transmitted, transmitting the contents of memory five times) and goes back to sleep 220. If it was not wakened by the pushbutton, it directs the analog-to-digital converter to perform a conversion 210, it increments the value of Reading 212 and it stores the data 214. The method of storing the data will be discussed below. It then tests 216 whether its transmit counter is active. If not, it goes to sleep. If so, it transmits data 218, decrements the counter 220 and goes to sleep. The counter ceases to be active when decremented to zero. Each transmission of data includes data on the logger configuration (logger type, serial number, number of bytes per sample, memory segment size, number of segments, and sampling interval), the current reading number, and the contents of the data memory.

FIG. 3 details the recording process 214 for the first embodiment. The recording of a data sample begins with determining in which segment a data sample will be placed. The reading number, RDG, is placed in temporary variable RDGT and variable SEG is set equal to zero 302. Next, the code enters a loop, the first step of which 304 is to test whether SEG has yet reached its maximum value, NO_SEG−1. If so, the code exits the loop. If not, it proceeds to test 306 whether RDGT is an even number. If it is odd, the variable SEG has reached the appropriate value and the code exits the loop. If it is even, SEG is incremented and RDGT is divided by two 308. The code then returns to the test 304 of whether SEG has reached its maximum value, and repeats the process. The code exits the loop either at 310, by determining how many times RDGT must be divided by two in order to produce an odd number, or at 312, because the variable SEG reached the maximum allowable value. In either case, SEG represents the segment of memory in which the sample will be stored.

The next step is to determine the address for the sample within the segment of memory. For any segment but the last, the microcontroller subtracts one from RDGT and divides the result by two 310. For the last segment, the microcontroller subtracts one from RDGT but does not divide by two 312. The address within the segment, ENT (entry) is then calculated 314:

ENT=REM(RDGT/SEG_SIZE).

REM is the remainder function, giving the integer remainder that results from the division of two integers. If SEG_SIZE is 2^N, the microcontroller performs the remainder operation by taking the N rightmost bits of RDGT. The address within memory is then calculated:

ADDR=(SEG*SEG_SIZE+ENT)*SAMP_SIZE

The sample is then written into memory, starting at the calculated address 316.

The contents of the EEPROM are transferred to an array in the host computer in sequential order but not, in most cases, in chronological order. To provide a useful output the host computer must place the samples into a sequence arranged in chronological order and it must assign date and time values to each sample. The approach it uses is to start with the most recent reading number and work backwards, calculating which reading numbers will currently be represented in the array, and reading out and storing the corresponding data samples.

Providing the logger has been recording long enough, there will be 2*SEG_SIZE or 2*SEG_SIZE−1 samples whose reading numbers (values of RDG) are spaced by one. We will refer to this spacing of reading numbers as STEP. After these (before them in time) there will be SEG_SIZE or SEG_SIZE–1 samples spaced by a STEP of two. The data sample at the point where the step size changes is counted with the group having the larger step size. After the values spaced by a STEP of two will be SEG_SIZE or SEG_SIZE–1 values spaced by four, then eight and so on, the value of STEP being doubled with each group of equally-spaced samples.

The process used by the computer to locate the data samples in the array is illustrated in FIG. 4. The computer begins 402 by setting RDG equal to the current reading number, setting STEP equal to one, setting COUNT equal to twice SEG_SIZE minus 1 and setting N, which will count the samples read from the array to SEG_SIZE NO_SEG, the maximum number of samples the memory can contain. It then enters a loop, in which it first calculates the address of the current sample within the array read from the logger, reads that sample from the array, and stores it, along with RDG, in a new array of sorted data samples 404. The variable N is used as a subscript for the variables in this array.

Next the computer determines 422 the value of RDG for the next data sample to be read. If COUNT is zero 406 or COUNT is one 408 and RDG/STEP is not odd 410, it moves to a group of data samples at a longer sampling interval. It does this 414 by setting RDG equal to RDG minus STEP, then doubling STEP and setting COUNT equal to SEG_SIZE minus 1. If the cited conditions do not hold and the sampling interval is to remain the same, it sets RDG equal to RDG–STEP and decreases COUNT by one 412. In either case, the computer goes on to determine whether the newly-determined value of RDG is zero 416 or if N has become zero 418. In either of those cases it is done 420; otherwise it returns to 404 to process the next data sample.

To determine the address within the array of data from the logger of a data sample corresponding to a reading number RDG, the computer first determines SEG and ENT for that data sample. SEG is the lesser of the number of times two can be evenly divided into RDG and (NO_SEG–1). For the last segment, ENT is calculated by the formula:

$$ENT = REM[\{RDG/(2\hat{}SEG)-1\}/SEG\_SIZE].$$

For all other segments, ENT is calculated by the formula:

$$ENT = REM[\{RDG/2\hat{}SEG-1)/2\}/SEG\_SIZE].$$

The computer then calculates the address of the first byte of the data sample:

$$ADDR = 1 + (SEG * SEG\_SIZE + ENT) * SAMP\_SIZE$$

Any additional bytes in the sample follow immediately afterward.

After reading all of the data samples from the array and storing them, the computer contains an array of data samples paired with reading numbers in chronological order. If the logger was not full when it was downloaded, a portion of the array, starting at the beginning, will be blank. For each reading number the computer calculates a date and time value:

$$TIMEVAL = Now - (READING - RDG) * INTERVAL$$

where TIMEVAL is a number representing date and time in a system recognizable to the computer, Now is a computer-generated value representing the current time, READING is the reading number of the most recently-recorded data sample, RDG is the reading number corresponding to the data sample currently being processed, and INTERVAL is the recording interval of the logger. (If a significant time elapsed between downloading of the data and processing of the data, Now would be replaced with the time when the download occurred.)

DETAILED DESCRIPTION OF THE SECOND EMBODIMENT

Overview of the Recording Technique

The device is pre-programmed to record maximum, minimum or average (or more than one of these in separate sections of a larger memory). Each sample could be discrete, or it could be a maximum, minimum or average taken over the period since the previous sample. Again the memory is divided into segments of equal length. We will again assume 16 segments, numbered zero through 15, each containing 512 samples. Each sample is recorded in segment zero. Data are recorded from the first location in the segment to the last; the segment is then repeatedly overwritten from the first location to the last as more data are recorded. When an odd-numbered sample is about to be overwritten, its value is combined with that of the next sample, and the result is recorded in Segment 1. Segment 1, similarly, is recorded from first location to last and then repeatedly overwritten. When an odd-numbered sample in Segment 1 (as counted from the first sample recorded in that segment) is overwritten, it is combined with subsequent even-numbered sample and written into Segment 2. All of the segments are treated in the same way, except that samples from the last segment are lost when they are overwritten.

Example 2 illustrates the technique for a 16-cell memory to which 19 samples have been written. When Sample 19 was written into Segment 0, it displaced Sample 15. Sample 15 was therefor combined with Sample 16 and written into Segment 1. When the combined sample 15 . . . 16 was written into Segment 1, it took the place of Sample 7 . . . 8. At that point nothing was written into Segment 2 because Sample 7..8 was even-numbered, that is, the fourth sample written into Segment 1. The combined sample 5 . . . 8 had already been written into Segment 2, preserving the data in Sample 7..8.

|  | Segment 0 | Segment 1 | Segment 2 | Segment 3 |
|---|---|---|---|---|
| Entry 0 | 1̶ 5 9 1̶3̶ 17 | 1̶.̶.̶2̶ | 9..19 | 1..4 |
| Entry 1 | 2̶ 6 1̶0̶ 1̶6̶ 18 | 3̶.̶.̶4̶ | 11..12 | 5..8 |
| Entry 2 | 5̶ 7̶ 1̶1̶ 1̶5̶ 19 | 5̶.̶.̶6̶ | 13..14 | |
| Entry 3 | 4̶ 8̶ 1̶2̶ 16 | 7̶.̶.̶8̶ | 15..16 | |

EXAMPLE 2

Progressive Recording and Combining of Samples in a Sixteen-Location Memory Consisting of Four Segments of Four Entries Each Detailed Description The second embodiment is a data logger similar to the first embodiment, differing in the method that is used to store data, and in the method used by the host computer to process the transmitted data. While the first embodiment might take 512 data samples during an hour and at some later time have that hour represented in memory by one of those data samples, the second embodiment would combine samples in some pre-specified way when eliminating samples to make space available in memory. It might, for example, take averages, and at some time have the hour represented by the average of all of the samples taken during the hour. (The method of combining might be to take the latter of the two samples being combined, and in this way achieve by the method of the second embodiment the result of the first embodiment.)

Figure 5:
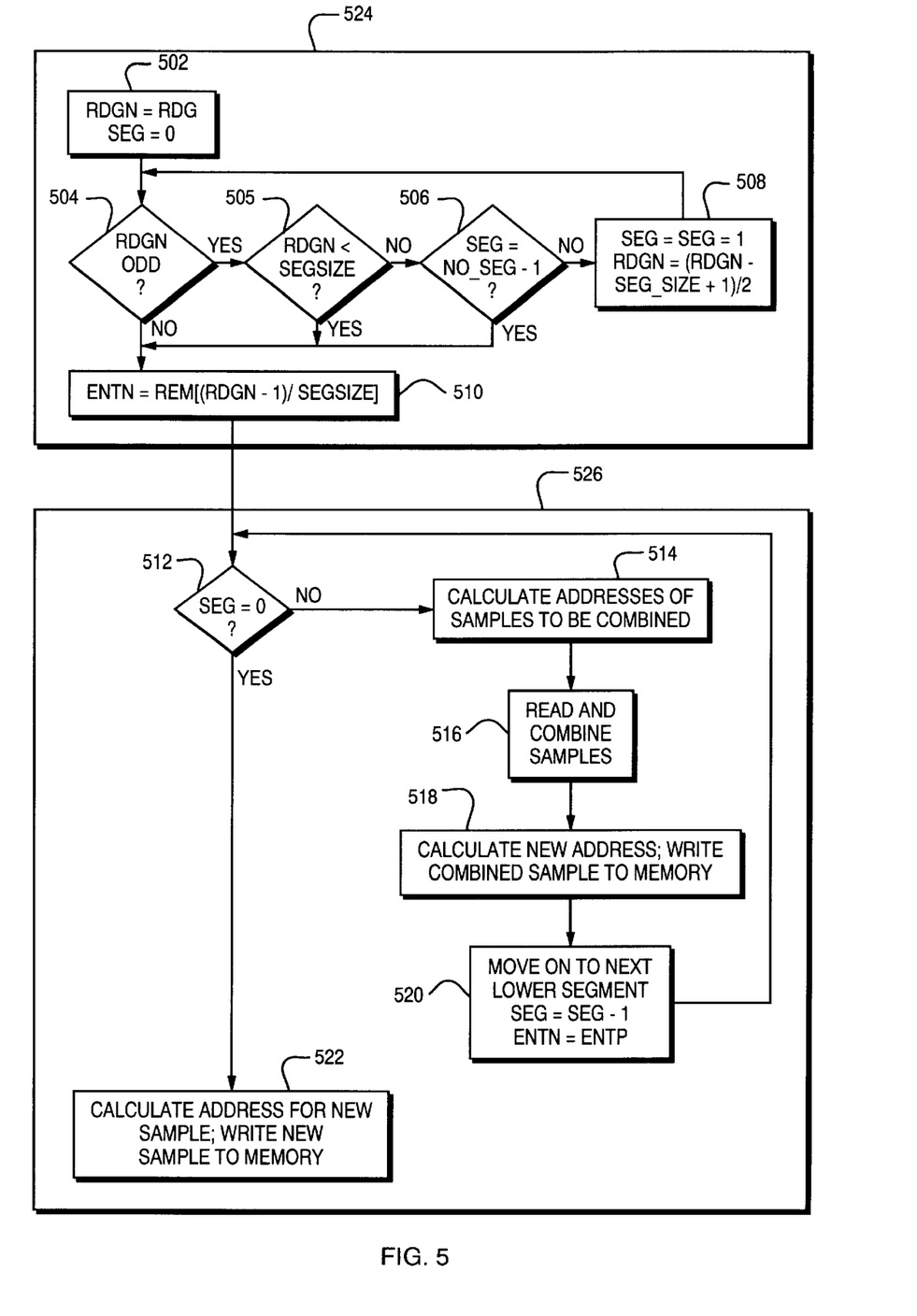

The recording process for combined samples is illustrated in FIG. 5. New data are recorded into Segment 0 and displaced older data are combined and recorded into Segment 1; data from that segment displace data in Segment 2, and so on. During some recording cycles no data samples beyond Segment 0 are overwritten; during others data samples in all of the segments are overwritten. The process begins with determining the highest-numbered segment that will be affected and which entry within that segment will be replaced.

The following variables are used by the Second Embodiment but not by the First Embodiment.

Reading—Nth Segment RDGN Just as it is useful to number all of the data samples recorded by the logger, it is also useful to number the data samples recorded into a particular segment since recording began. RDGN represents this number, for a particular data sample within a particular segment. This variable is not stored; as will be seen below it can be calculated when required from available information.

Entry in Nth Segment ENTN the address of a data sample within the Nth segment, counted starting with zero.

Entry in Previous Segment ENTP Having determined that a combined data sample must be recorded into a particular address in Segment N, it is necessary to determine the addresses within the previous segment from which to take data samples to combine. One of these addresses is ENTP, the other is ENTP+1.

The first step 524 in recording a data sample is to determine the last segment that will be affected and what sample within that segment will be affected. We begin 502 by copying RDG into the variable RDGN and setting SEG equal to zero. The process will work through the segments one by one, determining what entries are overwritten and what entries, if any, they in turn displace. The variable RDGN is a count of readings written into whatever segment is currently being examined, starting with the beginning of the recording process. One value of RDGN corresponds to each sample written into each segment of memory, just as one value of RDG corresponds to each sample recorded by the logger. Starting with Segment 0, the code determines 504 whether RDGN (for the current sample) is odd or even. If it is even, no values must be combined during this recording cycle. If it is odd, the code checks to see if it is less than SEG_SIZE 505. If so, the segment is not full. If it is full, the code goes on to check to see if the segment is the last 506. If the segment is not full, or if it is the last, no data must be combined in a later segment, and the microcontroller exits the loop. If the segment is full and not the last, the microcontroller increments SEG and calculates RDGN 508 for the data sample that will be written into the next segment. To do this, it starts with RDGN for the sample that is about to be written into the present segment, deducts SEG_SIZE to determine RDGN for the data sample presently in the memory location that will be used, and then adds one and divides by two to determine RDGN for the sample that will be written into the next segment of memory. The process repeats until a segment is reached in which RDGN is even (so that recording a sample in that segment will not result in a sample being displaced), the segment of memory being written to is not full, or the last segment of memory has been reached.

On exiting this loop, the microcontroller has determined the segment number (SEG) of the last segment affected by this recording cycle, and the reading number (RDGN) of the sample that will be recorded within that segment. The address of that entry, ENTN, is found 510 as follows.

$$ENTN=REM((RDGN-1)/SEG\_SIZE)$$

Next the microcontroller will work backward through memory 526 from the last affected segment to the first segment, writing into each segment the result of combining two data samples from the preceding segment.

To do this, it enters a loop in which it first tests 512 whether it is already in Segment 0. If so it exits, if not it proceeds 514 to calculate the addresses of the two samples in the previous segment that it will combine. The entry number within the segment, ENTP, of the first of the two is found as follows:

$$ENTP=REM[(2*ENTN)/SEG\_SIZE]$$

The address of that sample is:

$$ADDR=[(SEG-1)*SEG\_SIZE+ENTP]*SAMP\_SIZE$$

The address of the second sample is:

$$ADDR1=ADDR+SAMP\_SIZE$$

The microcontroller then reads the samples from memory 516, combines them in the specified manner (which may be taking the maximum, the minimum or the average of the two) and it writes the result to memory 518. It calculates the address where they must be written as follows:

$$ADDR=(SEG*SEG\_SIZE+ENTN)*SAMP\_SIZE$$

It then moves to the next lower segment, setting SEG equal to SEG−1 and ENTN equal to ENTP 520. It then returns to the test 512 which determines whether the segment number has reached zero.

The microcontroller repeats the loop until SEG is zero, at which point it exits at 512. It then writes the new data sample into memory 522 at the address calculated as follows.

$$ADDR=REM((RDG-1)/SEG\_SIZE)*SAMP\_SIZE$$

Figure 6:
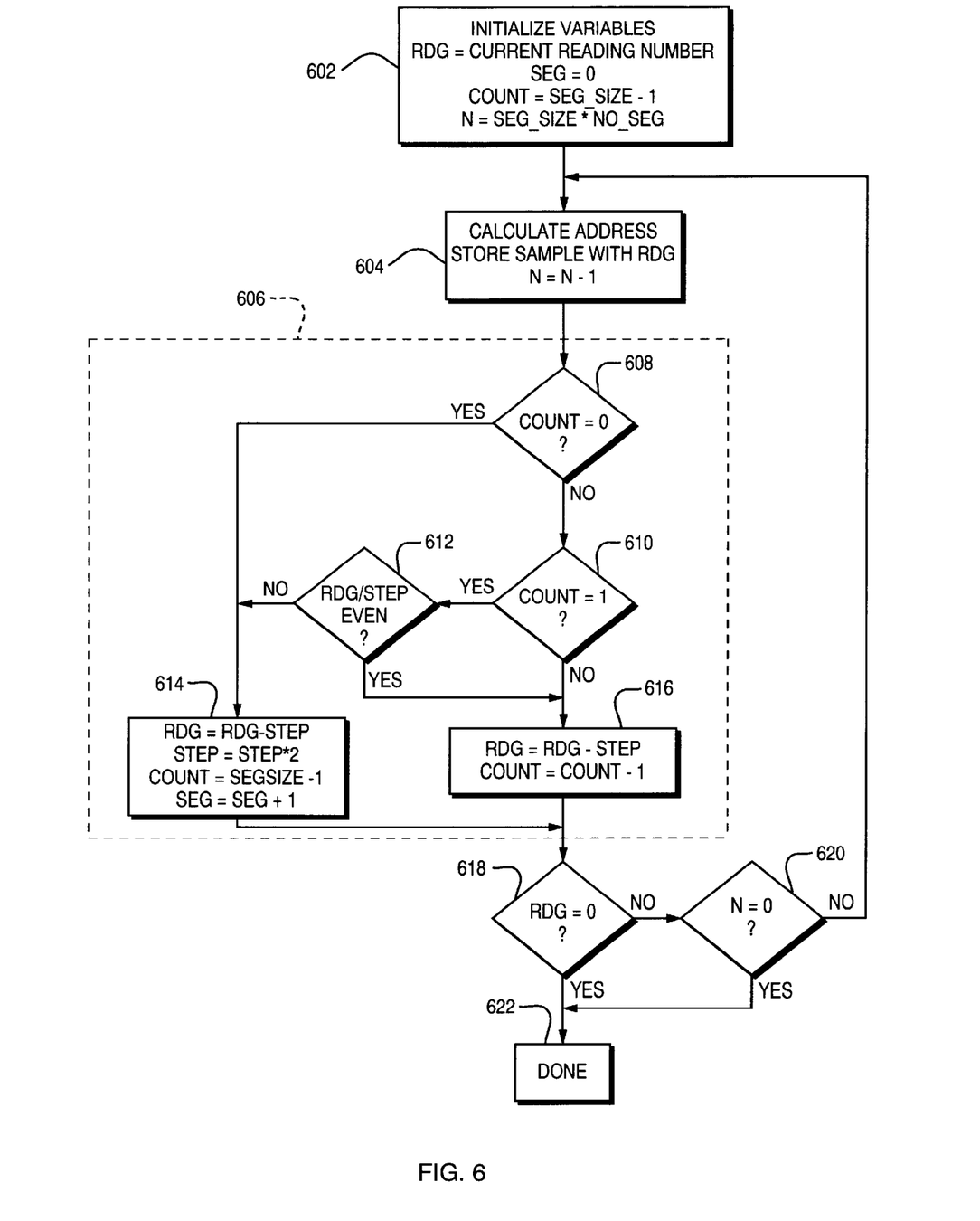

The function of the host computer is essentially the same for the second embodiment as for the first embodiment, except that a different process is required to extract the data from the array and place it in chronological order. That process is illustrated in FIG. 6. The process is, in short, to start with the newest data sample, which is somewhere in Segment 0, read backward to the start of Segment 0 and then from the end of Segment 0 to just after the newest sample, and then read Segment 1 backward from the newest data sample in that segment to the start and from the end to just after the newest sample, and so on through the remainder of the segments, or until the oldest recorded data is read.

The host computer first initializes 602 the variables that will be used in extracting the data from the array, it sets SEG equal to zero, and it sets N equal to NO_SEG* SEG_SIZE. It then calculates the address of the sample corresponding to RDG and stores that sample in an array, along with RDG 604. The variable N as a subscript identifying the locations of these values in the array. The computer calculates the address of the first byte of the sample as follows.

$$ADDR=[SEG*SEG\_SIZE+REM\{(RDG/2\hat{\,}SEG-1)/SEG\_SIZE\}]*SAMP\_SIZE+1.$$

Any additional bytes in the sample follow immediately afterward. After storing the sample, the computer subtracts one from N The computer next calculates 606 the value of RDG for the next sample that will be extracted from the array. It first determines whether or not it is time to move to the next segment of memory. If COUNT is zero or if COUNT is one and RDG/STEP is an odd number, all of the useful data samples have been read from the current segment. To move to the next segment of the array, the computer subtracts STEP from RDG, doubles STEP, adds one to SEG and sets COUNT equal to SEG_SIZE−1 614. If it is staying within the same segment, it subtracts STEP from RDG and subtracts one from COUNT 616. In either case it goes on to test whether RDG 618 or N 620 has become equal to zero. In either case it is done extracting data from the array 622; otherwise it returns to 604 to extract and store another sample. The process continues until RDG has been reduced to zero or the computer has read all of the samples from all of the segments of the array.

Having read all of the data from the array, the computer calculates the time corresponding to each segment, using the same formula that was used in the first embodiment. The time associated with each sample is the end time of the corresponding period of time.

Although specific features of the invention are shown in some drawings and not others, this is for convenience only, as these features may be combined in a manner apparent to those skilled in the art.

What is claimed is:

1. A method of saving data samples in a computer memory, the data samples representing data obtained over a period of time, and provided at a data input source, comprising:

dividing computer memory into a plurality of memory segments, each said segment having a plurality of data memory locations;

periodically obtaining data samples from the data input source;

sequentially saving all data samples obtained, except a first subset comprised of temporally equally-spaced samples, into the memory locations of the first memory segment; and sequentially saving into memory locations of a second segment of memory all of said subset of temporally equally-spaced samples, except a second subset of temporally equally-spaced samples taken from within the first subset, wherein the temporal spacing of the samples in the second subset is greater than the temporal spacing of the samples in the first subset.

2. The method of claim 1 further including recording into each subsequent segment of memory all samples not recorded into segments preceding that segment, except for another temporally equally-spaced subset of those samples, wherein the temporal spacing of the samples in each subset is grater than the temporal spacing of the samples in the preceding subset, and with the exception that all samples not recorded into segments other than the last segment will be recorded into the last segment.

3. The method of claim 1 in which sequentially saving data samples includes, when all of the memory locations in a segment are full, sequentially overwriting the data in the memory locations of said segment in the same sequence as before so that the oldest data in any particular segment is always the next to be overwritten.

4. The method of claim 1 further including retrieving saved data organized into chronological order.

5. The method of claim 3 in which the memory consists of n segments, each containing space for m data samples, where m is divisible by $2^{(n-1)}$, and in which every odd-numbered sample is written into segment 1, every sample whose number is divisible by two and not by four is written to segment 2, every sample whose number is divisible by $2^{(s-1)}$ and not by $2^s$ is written to segment s, for all positive integers s less than n, and all remaining samples are written to segment n.

6. The method of claim 1 wherein all samples are written into segment 1.

7. A method of saving data samples in a computer memory, the data samples representing data obtained over a period of time, and provided at a data input source, comprising:

dividing computer memory into a plurality of memory segments, each said segment having a plurality of data memory locations, the first segment having at least n memory locations;

periodically obtaining data samples from the data input source;

sequentially saving the first n obtained data samples into the n memory locations of the first segment;

combining two of the n saved data samples, and saving the combination into a memory location of the second segment; and saving another later obtained data sample into the memory location of one of the combined data samples.

8. The method of claim 7, further including, as new data samples are to be recorded, sequentially combining each two contiguous data samples of the n saved data samples, and sequentially saving the combinations into memory locations of the second segment, and then saving the new data samples into the memory locations of the combined data samples.

9. The method of claim 8 further including, for each said memory segment except one, once each data memory location has data saved therein, sequentially combining each two contiguous data samples in a given segment, and sequentially saving the combinations into memory locations of another particular segment, and then saving other later obtained data samples into the memory locations of the combined data samples.

10. The method of claim 7 wherein combining two of the n saved data samples comprises averaging said two data samples.

11. A method of saving data samples in a computer memory, the data samples representing data obtained over a period of time, and provided at a data input source, comprising:

dividing computer memory into a plurality of memory segments, each said segment having a plurality of data memory locations;

periodically obtaining data samples from the data input source;

sequentially saving all data samples obtained, except a first subset comprised of temporally equally-spaced samples, into the memory locations of the first memory segment;

sequentially saving into memory locations of a second segment of memory all of said subset of temporally equally-spaced samples, except a second subset of temporally equally-spaced samples taken from within the first subset, wherein the temporal spacing of the samples in the second subset is greater than the temporal spacing of the samples in the first subset; and recording into each subsequent segment of memory all samples not recorded into segments preceding that segment, except for another temporally equally-spaced subset of those samples, wherein the temporal spacing of the sample in each subset is greater than the temporal spacing of the samples in the preceding subset.

* * * * *